Nov. 18, 1958
C. E. BREITHAUPT
2,860,784
FILTRATION METHOD
Filed March 15, 1955
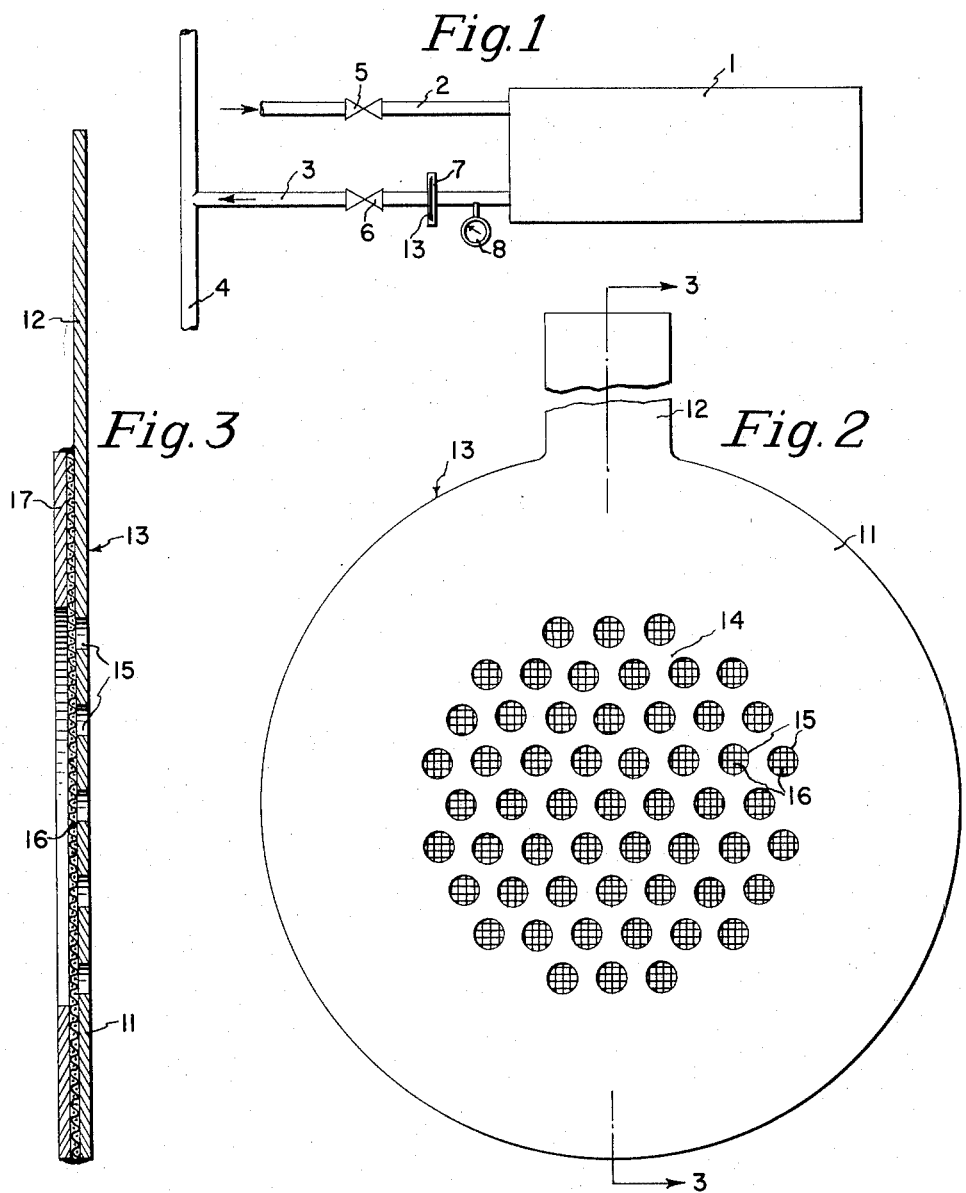
INVENTOR
CHARLES E. BREITHAUPT
BY Charles A. McClure
ATTORNEY

United States Patent Office 2,860,784
Patented Nov. 18, 1958

2,860,784

FILTRATION METHOD

Charles E. Breithaupt, Waynesboro, Va., assignor to E. I. du Pont de Nemours and Company, Wilmington, Del., a corporation of Delaware Application March 15, 1955, Serial No. 494,321

2 Claims. (Cl. 210—75)

This invention relates to improvement of filtration, concerning particularly monitoring for breaks in filters supplied with finely divided materials as filtering aids and ameliorating the consequences thereof.

One method of removing very small particulate impurities from liquid medium involves addition of finely divided solids large enough to accumulate on conventional filter elements but so small as to compact thereon closely enough to act as a supplementary fine filter effective against the undesired particles. For example, cellulosic fibers, such as cotton linters or fragmented wood pulp, are accepted as aids to filtration in a variety of industries, including manufacturing of synthetic textile yarns and the like by extrusion of high polymers. Conventioned filter elements used in conjunction with the mentioned filtering aids frequently are susceptible to rupture or other failure to admit some of the fibrous filtering aid and, as well, some of the particles it was designed to exclude, thus materially handicapping any subsequent stage of filtration or use of the liquid medium in the absence of further filtration.

A primary object of the present invention is improvement in filtration of liquid medium containing finely divided aiding solids. An object is prompt detection of rupture or similar failure in filters utilizing finely divided solids as filtering aids. Other objects of this invention, together with means and methods for accomplishing the various objects, will be apparent from the following description and the accompanying diagrams.

Figure 1 is a schematic plan view of an arrangement of filtering and associated elements according to this invention. Figure 2 is a view of the face of an element in the apparatus of Figure 1. Figure 3 is a section through the apparatus at 3—3 of Figure 2.

In general, the objects of the present invention are accomplished by connecting pressure-responsive means immediately downstream from a filter for liquid medium supplied with finely divided solids as a filtering aid and inserting perforate flow-restricting means downstream therefrom. A suitable arrangement involves a simple pressure gage and a screen as the respective added means. Upon failure of the regular filter and consequent passage of filtering aid therethrough, appreciable collection of filtering aid occurs on the inserted screen, accompanied by increase of pressure therebetween, as registered by the pressure gage.

Figure 1 represents a conventional plate-and-frame filter 1 fed by inlet line 2 and feeding into outlet line 3 connected to exhaust manifold 4, the respective lines containing inlet valve 5 and outlet valve 6. Across the outlet line between the filter and the outlet valve is housing 7 containing perforate flow-restricting element or "restrictor" 13, while pressure gage 8 connects to the outlet line between the filter and the monitor element. The restrictor appears in some detail in Figure 2, which shows the face of front retaining plate 11 with handle 12 extending from the periphery thereof, central portion 14 of the plate being perforated by numerous apertures 15. Woven mesh of screen 16 is visible through the apertures in this cover plate, which faces downstream. Figure 3 shows the plate edge-on in central cross section taken through the handle, revealing also back retaining ring 17 affixed to the front plate at the peripheral edge to sandwich the screen therebetween.

The practice of this invention using the equipment just described is exemplified by filtration of a 25% solution of cellulose acetate (by weight) in acetone, having a solution viscosity suitable for fiber manufacture and comprising a few tenths percent in weight of wood-pulp fibers averaging several hundredths of an inch long and several thousandths of an inch in diameter. The mixture containing the filtering aid, which was added batchwise in a premixing tank, is pumped at gage pressure of 200 lbs. per sq. in. (p. s. i. g.) and elevated temperature through the inlet line to a conventional plate-and-frame filter containing several dozen rectangular plates (parallel) dressed with customary filtering medium. The normal pressure of the filtered liquid in the outlet line is 20 p. s. i. g. Several identical filters are fed in parallel through their respective inlet lines connected to a common source of the mixture to be filtered; each outlet line (3 inches in diameter) to a common exhaust manifold includes a conventional pressure gage and a restrictor of the kind described having cover plate and retaining ring of 16-gage carbon steel, with the cover plate itself (about 3 inches in diameter) containing 55 circular ¼ inch holes equally spaced on ⅜ inch centers, sandwiching a 40-mesh screen woven of stainless steel. The pressure drop across each restrictor during the early life of the filter is appreciably less than 50 lbs. After several hours of satisfactory operation, the pressure gage at the outlet of one of the filters is observed to have a somewhat higher rating than the other gages, doubling in a matter of several minutes after the discrepancy appears. Upon closing the inlet and outlet valves of this filter, the operator disassembles it and examines the dressing, which is observed to be torn. The operator redresses the filter, removes the restrictor and washes the accumulation of filtering aid from it with acetone, then returns the filter to operation by opening the line valves after reinserting the restrictor between the flanges that form the housing for it.

By accumulating the fibrous filtering aid, the restrictor raises the pressure in the intervening portion of the outlet line from the filter, as is apparent from the above example, and routine inspection of the pressure gage reveals the filter failure. The restrictor itself acts as an auxiliary filter against the finely divided filtering aid, preventing further contamination of the medium already filtered by the entire bank of filters and, incidentally, increasing the life of the customary succeeding bank of filters designed for optimum operation as a finer filter stage.

The flow-restricting element prescribed herein may take any of several forms so long as it constitutes perforate means capable of impeding the flow appreciably and thus accumulating the filtering aid upon occurrence of filter failure. The woven wire screen may give way to a plate pierced with much finer holes than are present in the retaining plates, which themselves may be dispensed with if the inner screen or plate is sufficiently strong to withstand the pumping pressure or, at intermediate strengths of the inner element, may be reduced to a metal grid. The size of the openings in the screen or plate of the restrictor depends upon the size of the finely divided solid material used as a filtering aid, being chosen fine enough to retain it adequately but coarse enough to keep the pressure drop across the entire element in the absence of clogging particles (such as bits of filtering aid) at a reasonably low level, preferably on the order of tens of pounds (e. g., 40 lbs.) for the unit described. The design of restrictor may be more complex, utilizing multiple screens or like elements, either adjacent or spaced from one another; however, the simple design shown is preferred for ease of removal and cleaning.

The pressure-responsive means may be equipped in obvious manner with lights, bells, or other means to call the operator's attention to build-up of pressure in the outlet line. Strain-gage or other force-measuring equipment may replace the usual simple diaphragm or bellows type of pressure-determining instrument, and the usual atmospheric reference level may be replaced by direct connection downstream from the restrictor upon filter failure. Furthermore, the pressure-responsive means may constitute more than a mere indicator, as by suitable connection to servo-mechanism adapted to operate the valves to and from the filter. Other modifications comprehended by the claimed invention will come readily to mind.

The claimed invention:

1. In the process of filtering a liquid containing a fibrous filtering aid by passing said liquid through a rupturable filtering means, the improvement comprising passing the filtrate liquid from the filtering means past a pressure-responsive means through a downstream perforate member capable of transmitting the filtrate without substantial pressure increase and which retains fibrous filtering aid upon rupture of the filtering means, whereupon the pressure at the downstream perforate member is increased by the massing of the filtering aid thereon and indicated by the pressure-responsive means, whereby ruptures in the upstream filtering means are detected.

2. The process improvement of claim 1 wherein the liquid comprises a solution of cellulose acetate in acetone.

References Cited in the file of this patent

UNITED STATES PATENTS

| | | |
|---|---|---|
| 434,571 | Sargent | Aug. 19, 1890 |
| 586,724 | Edmonds | July 20, 1897 |
| 2,025,570 | Clark | Dec. 24, 1935 |
| 2,322,428 | Eichemeyer | June 22, 1943 |
| 2,454,124 | Virsch et al. | Nov. 16, 1948 |